United States Patent [19]

Ulsh

[11] Patent Number: 4,633,562

[45] Date of Patent: Jan. 6, 1987

[54] ARROWHEAD EXTRACTOR

[76] Inventor: John R. Ulsh, Box 143, Summit Station, Pa. 17979

[21] Appl. No.: 688,064

[22] Filed: Dec. 31, 1984

[51] Int. Cl.⁴ .................. B23P 19/04

[52] U.S. Cl. .................. 29/264

[58] Field of Search .................. 29/256, 263, 264, 269, 29/273

[56] References Cited

U.S. PATENT DOCUMENTS

| | | | |
|---|---|---|---|
| 543,652 | 7/1895 | Palm . | |
| 1,395,587 | 11/1921 | McLachlan | 29/264 |
| 2,317,405 | 4/1943 | Rutten | 29/263 |
| 3,584,365 | 6/1971 | Cuen et al. | 29/256 |
| 3,634,921 | 1/1972 | Gagnon | 29/264 |
| 3,731,587 | 5/1973 | Digiacomo . | |
| 3,890,692 | 6/1975 | Jandura . | |
| 4,043,020 | 8/1977 | Hoggard . | |
| 4,097,979 | 7/1978 | Interdonato | 29/273 |
| 4,194,278 | 3/1980 | Sanders | 29/264 |
| 4,273,024 | 6/1981 | Veloni . | |

*Primary Examiner*—Robert C. Watson
*Attorney, Agent, or Firm*—Richard D. Weber

[57] ABSTRACT

An arrowhead extractor includes an elongated threaded rod having a threaded axial bore in one end thereof adapted for connection to the threaded shank of an embedded arrowhead. A sleeve is then disposed over the rod and a wing nut is screwed onto the rod into engagement with the end of the sleeve. Rotation of the wing nut provides relative movement between the rod and sleeve and an axial withdrawal of the embedded arrowhead.

3 Claims, 6 Drawing Figures

FIG. 1
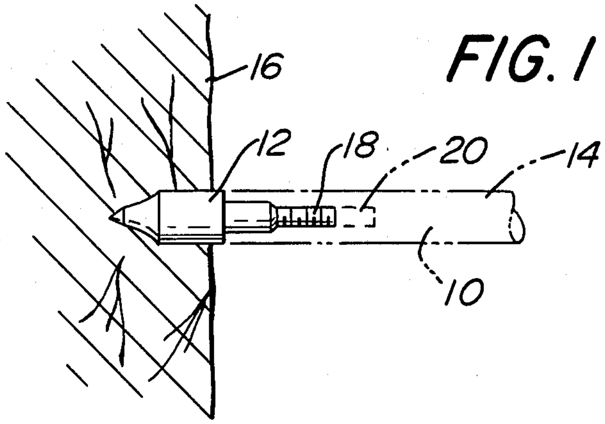
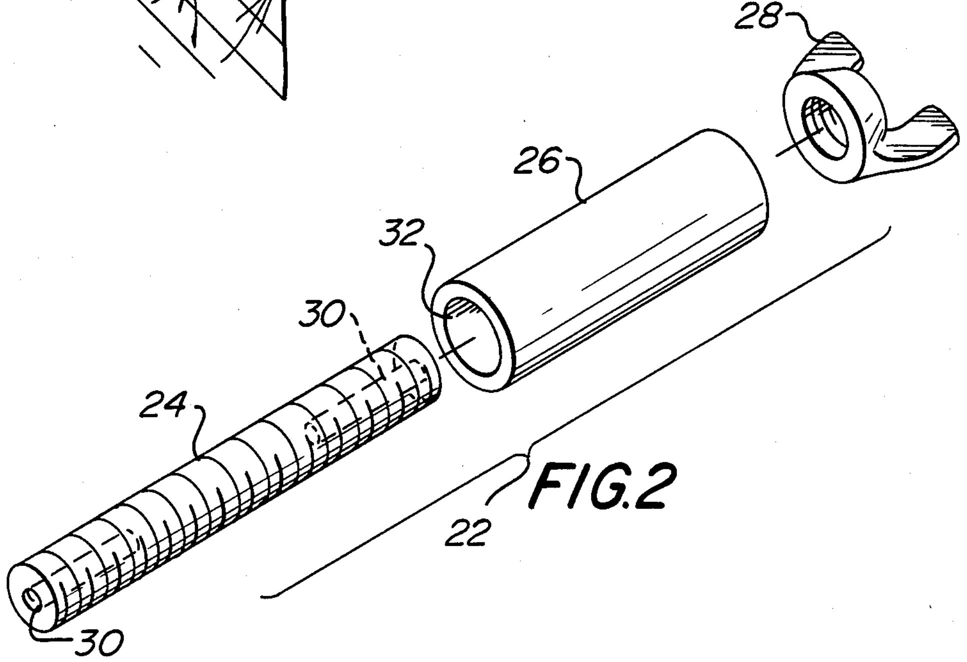
FIG. 2
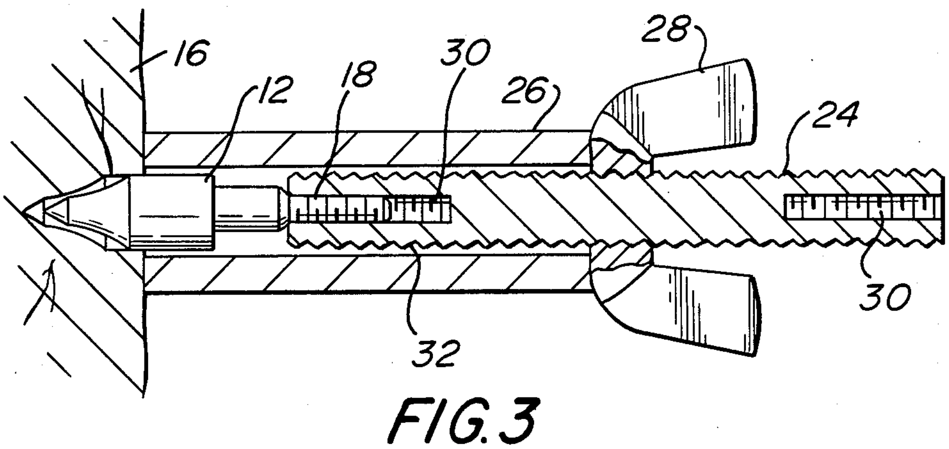
FIG. 3

ARROWHEAD EXTRACTOR

BACKGROUND OF THE INVENTION

The present invention relates generally to archery equipment and relates more particularly to a device for extracting arrowheads of the detachable threaded type from objects into which they have become embedded such as trees, target stands, etc.

Archery equipment has in recent years undergone significant technological changes, both with respect to the bows and the arrows. The introduction of the compound bow has permitted the development of more power resulting in high arrow velocities. The arrows themselves have become more refined, the better arrows having metal shafts with detachable arrowheads. The arrowheads are available in a variety of styles and may be separately purchased and attached to the shafts to suit the purposes and preferences of the archer.

When the intended target is missed, it is not unusual for the arrow to strike a wooden object such as the target stand, a tree, or even a building. When using a high powered bow, the arrow will become embedded to such a degree that removal is impossible without damaging or risking damage to the arrow shaft. In view of the relatively high cost of the shaft and the arrowheads, a need exists for an effective tool for salvaging errant arrows.

Several attempts to satisfy such need are exemplified by the disclosures of prior patents. In U.S. Pat. No. 3,890,692, an arrowhead extractor is disclosed wherein a threaded handle is substituted for the arrow shaft and then manipulated by swinging and/or tugging movements to dislodge the arrowhead. Such a device suffers the disadvantages of requiring substantial physical effort to remove the arrowhead and further is of such a size as to be awkward to carry about, especially when hunting. Because of its size and necessary strength, the device further must be of robust construction and would thus be expensive to manufacture.

A different approach is presented by U.S. Pat. No. 4,032,020 wherein a form of slide hammer is attached to the arrowhead and repeated impacts of the hammer employed to free the head. Such a device is even more unwieldy than that previously described in terms of portability and would be considerably more expensive to manufacture.

There accordingly exists a need for an inexpensive, compact, lightweight, easily manipulated device for dislodging errant arrowheads from embedment in target stands, trees, and similar penetrable objects.

SUMMARY OF THE INVENTION

The present invention includes an elongated threaded rod having a threaded axial bore in one end thereof adapted for threaded connection to the threaded shank of an embedded arrowhead following removal of the arrow shaft. An elongated hollow sleeve having a length shorter than that of the rod and having an inner diameter greater than the diameter of an arrowhead and of the rod, is disposed over the rod into engagement with the object in which the arrowhead is embedded. A wing nut is then threadedly advanced on the extending end of the rod into engagement with the end of the sleeve. Continuing rotation of the wing nut effects a relative axial movement of the rod and sleeve, thereby withdrawing the embedded arrowhead into the sleeve.

In a modified form of the invention suited for larger arrowheads, a sleeve of larger diameter is selected and a guide provided on the threaded rod to center the sleeve with respect to the embedded arrowhead to prevent interference therebetween upon withdrawal of the arrowhead. In the modified embodiment, an apertured end member is provided for the sleeve to provide a bearing surface for the wing nut.

It is accordingly a primary object of the present invention to provide an arrowhead extractor which can be easily manipulated to withdraw an embedded arrowhead with a minimum amount of physical effort.

Another object of the invention is to provide an arrowhead extractor as described of a lightweight, compact design which may be easily carried in a pocket.

A further object of the invention is to provide an arrowhead extractor as described of a simple, inexpensive construction which can be readily manufactured from standard stock materials.

Additional objects and advantages of the invention will be more readily apparent from the following detailed description of preferred embodiments thereof.

BRIEF DESCRIPTION OF THE DRAWINGS

FIG. 1 is an elevational view partly in section showing an arrowhead embedded in a wooden object and showing in broken lines the front end of the detachable arrow shaft;

FIG. 2 is an exploded perspective view showing the components of an arrowhead extractor in accordance with the present invention;

FIG. 3 is a sectional elevational view showing the arrowhead extractor of FIG. 2 applied to the arrowhead of FIG. 1 with the extraction thereof nearly completed;

DESCRIPTION OF THE PREFERRED EMBODIMENTS

Figure 4:
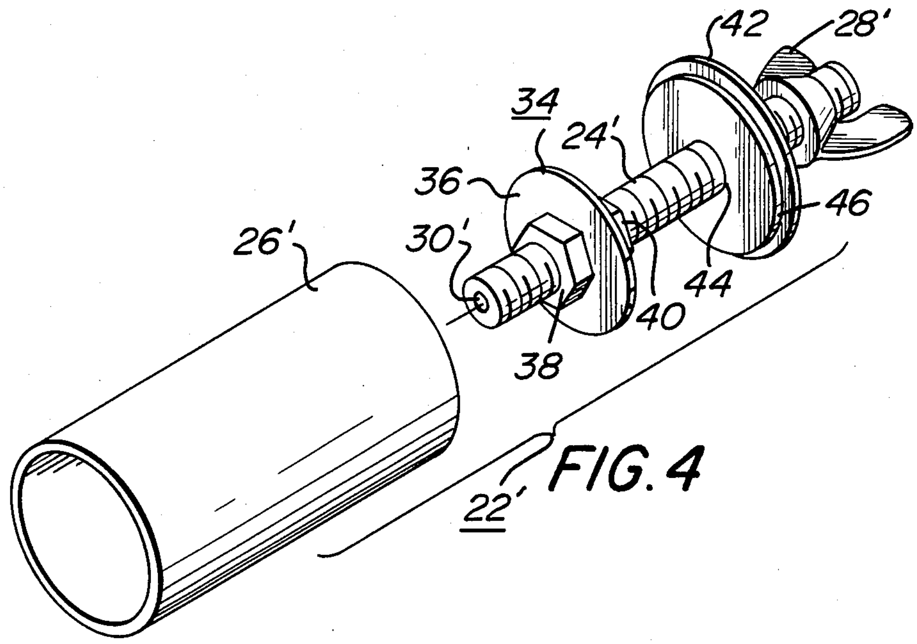
FIG. 4 is a perspective view showing a modified form of arrowhead extractor.

Referring to the drawings and particularly FIG. 1 thereof, a portion of an arrow 10 including the arrowhead 12 and arrow shaft 14 are illustrated, with the arrowhead 12 embedded in a wooden object 16 such as a tree, target stand or the like. The arrowhead 12, which is of a style known as a field point, includes a threaded shank portion 18 which is screwed into a complimentary threaded bore 20 of the arrow shaft 14.

Although it might be possible to free the arrow 10 from the object 16 by grasping and manipulating the arrow shaft, such activity could result in a permanent deformation of the shaft, rendering it useless. Accordingly, in order to preserve the shaft, the shaft is unscrewed from the arrowhead and the arrowhead is extracted utilizing the invention as will now be described in detail.

Referring to FIGS. 2 and 3, an arrowhead extractor 22 in accordance with the present invention comprises an elongated externally threaded rod 24, a cylindrical sleeve 26, and a wing nut 28. A threaded axial bore 30 is provided in each end of the threaded rod 24, although it will be obvious from the description of the use of the device that a single such bore is all that is required, the other bore being provided as a convenience to eliminate the need for searching for the bored end.

The threaded rod 24 is preferably of a diameter equal to or greater than that of the arrowhead to be extracted, and the internal diameter 32 of the sleeve 26 should provide ample clearance for both the rod 24 and the arrowhead. The length of the rod 24 is preferably longer than the sleeve 26 to allow recovery of deeply embedded arrowheads.

The use of the device is illustrated in FIG. 3. As shown, the threaded rod 24 is attached to the embedded arrowhead 12 by threadedly engaging the arrowhead shank 18 with one of the rod bores 30. The sleeve 26 is then placed over the rod and the protruding end of the arrowhead and into engagement with the object 16 into which the arrowhead is embedded. The thumbscrew 28 is then threaded onto the rod 24 and advanced into engagement with the sleeve 26. Further rotation of the thumbscrew provides a relative movement of the sleeve and the rod, resulting in the extraction of the arrowhead from the object 16. Following the extraction, the arrowhead is unscrewed from the rod and may then be reattached to the arrow shaft.

Figure 5:
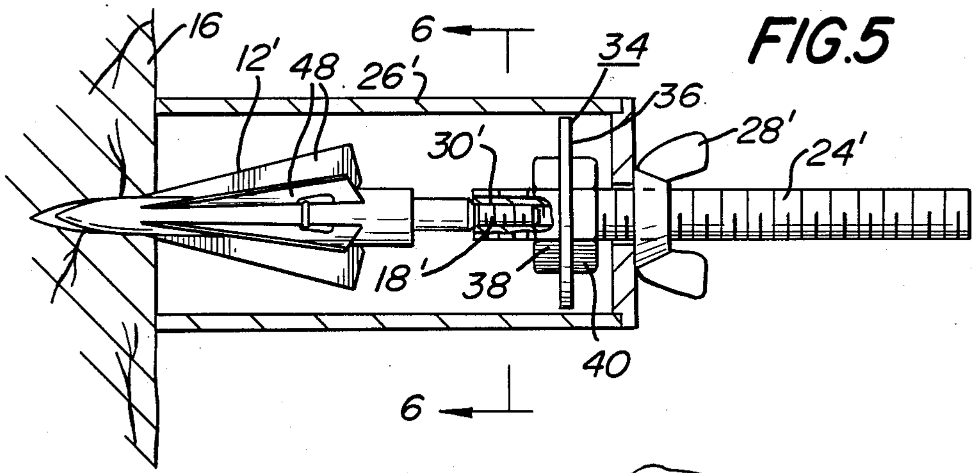
FIG. 5 is a sectional elevational view showing the arrowhead extractor of FIG. 4 in use.
Figure 6:
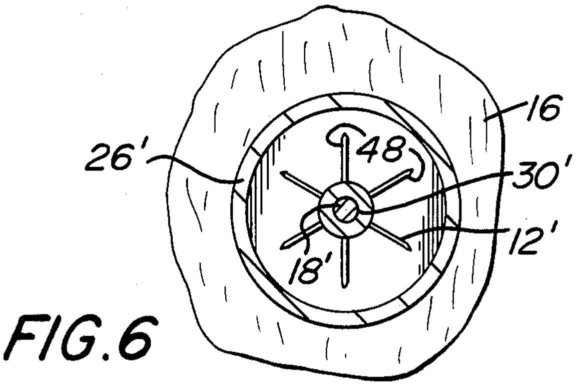
FIG. 6 is a sectional view taken along line 6—6 of FIG. 5.

A modified form 22' of the invention is shown in FIGS. 4–6 and is intended for use with larger arrowheads. The modified form includes a sleeve 26' of a substantially larger diameter than that of the previously described embodiment, which diameter is sufficient to provide clearance with large arrowheads such as the type known as a broadhead, a six bladed example of which is shown in FIG. 5 at 12'. The modified embodiment includes a threaded rod 24' and a wing nut 28' which are essentially of the same construction as in the previous embodiment. The rod 24' includes threaded axial bores 30' at each end thereof to permit attachment of the rod to an embedded arrowhead.

Mounted on the threaded rod 24' adjacent one end thereof is a centering guide 34 comprising a washer 36 held captive between a pair of nuts 38 and 40. Loosely disposed on the rod 24' is a circular stop plate 42 having a coaxial bore 44 of a size allowing free passage of the rod and including an annular peripheral recess 46 to permit seating of the stop plate in one end of the sleeve 26' as shown in FIG. 5.

The operation of the modified embodiment of the invention is quite similar to that previously described. The rod 24' is threaded onto the extending end of the embedded arrowhead 12', following which the sleeve 26' is coaxially positioned over the arrowhead and rod, the centering guide 34 serving to substantially center the sleeve on the object 16 with respect to the arrowhead and prevent engagement of the arrowhead with the sleeve upon its withdrawal. The stop plate 42 and wing nut 28' are then positioned on the rod and advanced along the rod until the stop plate is seated as illustrated in FIG. 5 with the recess 46 receiving the end of the sleeve. Further advancement of the wing nut serves to draw the rod and attached arrowhead axially outwardly, thereby freeing the arrowhead without deformation thereof. Arrowheads of the broadhead type include a plurality of thin razor-like blades which can easily be bent if mishandled. The present device by insuring a straight, axial withdrawal of the arrowhead insures the recovery of the arrowhead without damage.

Although the sleeves 26 and 26' have been shown as cylindrical members, they could be of a different shape, for example square or triangular or any other shape that would provide an adequate hollow space for withdrawal of the rod and arrowhead. Similarly, although wing nuts 28 and 28' have been illustrated, other types of internally threaded rotatable members such as a small hand wheel, lever, or crank could also be employed in threaded cooperation with the rod to effect relative movement between the rod and sleeve.

From the foregoing it can be appreciated that the present invention provides a simple, inexpensive, compact arrowhead extractor which can be easily manipulated to remove any type of embedded arrowhead having a threaded shank. The physical force required to turn the wing nut is minimal and arrowheads may be quickly recovered without risk of damage to the shaft or the arrowhead.

Manifestly, changes in details of construction can be effected by those skilled in the art without departing from the spirit and scope of the invention.

I claim:

1. An arrowhead extractor for detachable arrowheads of the type having a threaded shank, comprising:
- an externally threaded rod,
- a threaded axial bore in one end of said rod adapted for threaded connection to the threaded shank of an embedded arrowhead,
- a hollow cylindrical sleeve having a diameter greater than the diameter of the arrowhead and adapted to slide over said rod and the arrowhead following threaded attachment of said rod to the shank of an embedded arrowhead, said sleeve being shorter in length than said rod,
- a centering guide on said rod adjacent the end thereof containing the axial bore, said guide effecting a centering of said sleeve with respect to said rod, said guide comprising a washer disposed on said rod, and a pair of nuts on said rod flanking said washer to secure the washer in position on said rod,
- a wing nut threadedly attachable to said rod,
- and an apertured stop plate slideable on said rod, said stop plate being adapted to engage said sleeve and provide a stop for said wing nut,
- the rotation of said wing nut on said rod upon engagement with said sleeve effecting relative movement between said rod and said sleeve to extract the embedded arrowhead.

2. The invention as claimed in claim 1, wherein said stop plate includes a central aperture for passage of said rod, and means for centering said plate and said aperture with respect to the axis of said sleeve.

3. The invention as claimed in claim 1, wherein said latter means comprises a peripheral recess in said plate for receiving the end of said sleeve.

* * * * *